Jan. 4, 1938.    L. T. GOATES    2,104,122
ENGINE VALVE ACTUATING DEVICE
Filed March 25, 1936    2 Sheets-Sheet 1

Lafayette T. Goates
INVENTOR

ATTORNEY

Jan. 4, 1938.　　　　　　L. T. GOATES　　　　　2,104,122
ENGINE VALVE ACTUATING DEVICE
Filed March 25, 1936　　　2 Sheets-Sheet 2
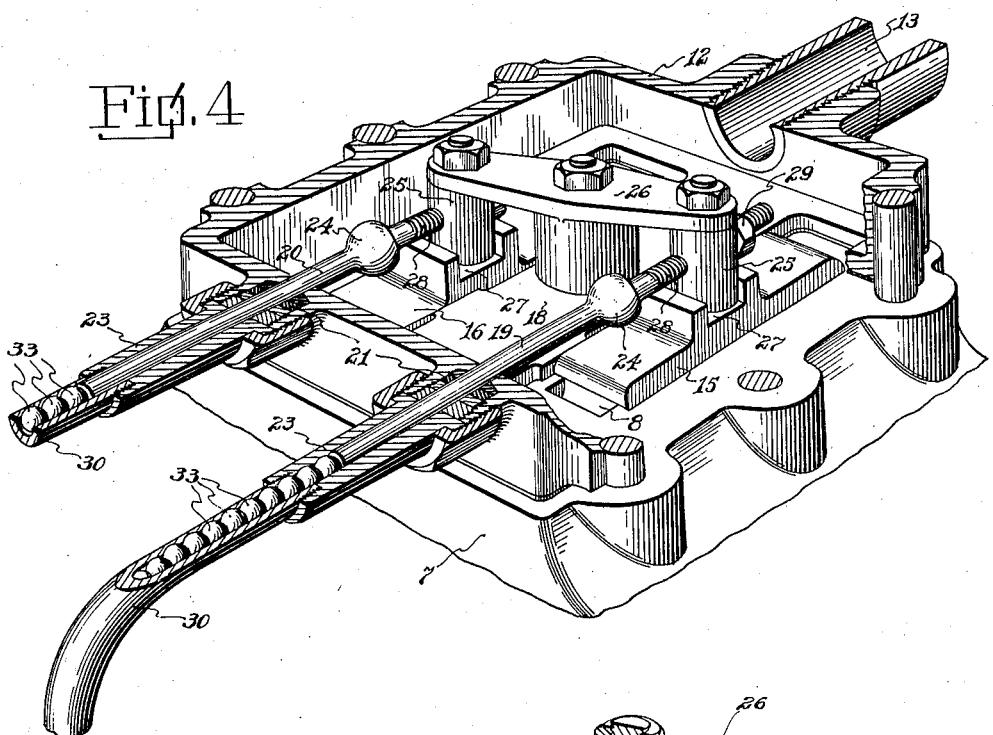
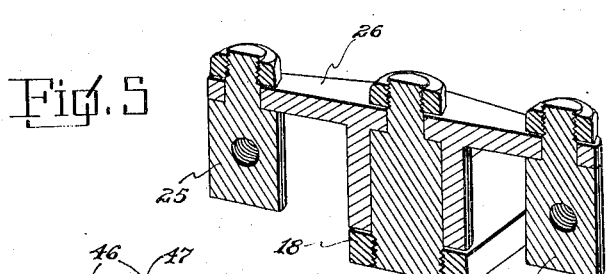
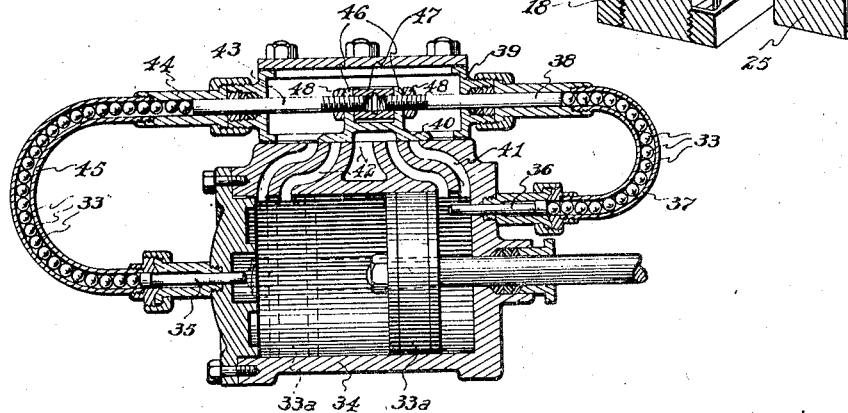
Lafayette T. Goates
INVENTOR
ATTORNEY Patented Jan. 4, 1938

2,104,122

UNITED STATES PATENT OFFICE 2,104,122

ENGINE VALVE ACTUATING DEVICE

Lafayette T. Goates, Tulsa, Okla.

Application March 25, 1936, Serial No. 70,879

2 Claims. (Cl. 121—164)

The invention relates to engine valve actuating mechanism particularly adapted for use in connection with steam engines used in connection with pumps, and has for its object to eliminate the bulky engine structures for reversing the slide valve within the steam chest, and to eliminate the usual heavy bell crank and rocker arm control lever mechanism which adds considerable weight and bulkiness to engines of this general type as now constructed, and on account of said weight increasing the amount of power necessary to operate the engine.

A further object is to provide, in connection with a reciprocating piston in a cylinder and a slide valve controlling the admission of expansive fluid to the cylinder and exhaust of fluid from the cylinder, a slidable flexible connection operated by the piston and connected to the slide valve for shifting the slide valve.

A further object is to provide an axially movable rod in the path of the piston and a similar rod connected to the slide valve, said rods being slidably mounted in the ends of a tubular member and a flexible means interposed between the rods and in the tubular member and forming means whereby, when one rod is forced into the tubular member, the other rod will be forced outwardly for operating the valve or for positioning for contact with the piston.

A further object is to provide a rock lever within the steam chest and cooperating with the valves for controlling alternate supply of steam to adjacent cylinders and exhaust from adjacent cylinders and duplicate slide rods carried by the rock lever and actuating duplicate slide rods in the paths of the pistons within the cylinders through flexible members slidably mounted in adjacent tubular members.

A further object is to provide the rock lever with pivoted bosses slidably mounted for transverse movement in the slide valves and having adjusting shafts therein, which shafts have universal connection with the actuating slide rods extending into the steam chest.

A further object is to provide a single cylinder valve actuating mechanism comprising tubular members connecting the ends of the steam chest and the ends of the cylinder and rods slidably mounted in the ends of the tubular members in the path of the piston within the cylinder at the ends of its strokes and connected to the slide valve within the steam chest and flexible slidable means within the tubular members between the slide rods and forming means whereby as the piston reaches the ends of its stroke the slide valve within the steam chest will be shifted for intake or exhaust position.

A further object is to form the flexible means within the tubular members from engaged spherical members entirely filling the tubular members longitudinally and engaging the push rods.

A further object is to provide means for adjusting the push rods, thereby allowing an accurate adjustment of the slide valve in relation to the intake and exhaust ports.

With the above and other objects in view the invention resides in the combination and arrangement of parts as hereinafter set forth shown in the drawings, described and claimed, it being understood that changes in the precise embodiment of the invention may be made within the scope of what is claimed without departing from the spirit of the invention.

In the drawings:

Figure 4 is an enlarged perspective view of the valve control mechanism within the steam chest, parts being shown in horizontal section to better illustrate the structure.

Figure 5 is a detail perspective view showing the rock lever in vertical longitudinal section.

Figure 6 is a vertical longitudinal sectional view through a modified form of valve control mechanism, particularly adapted for use in connection with single cylinder engines.

Figure 1:
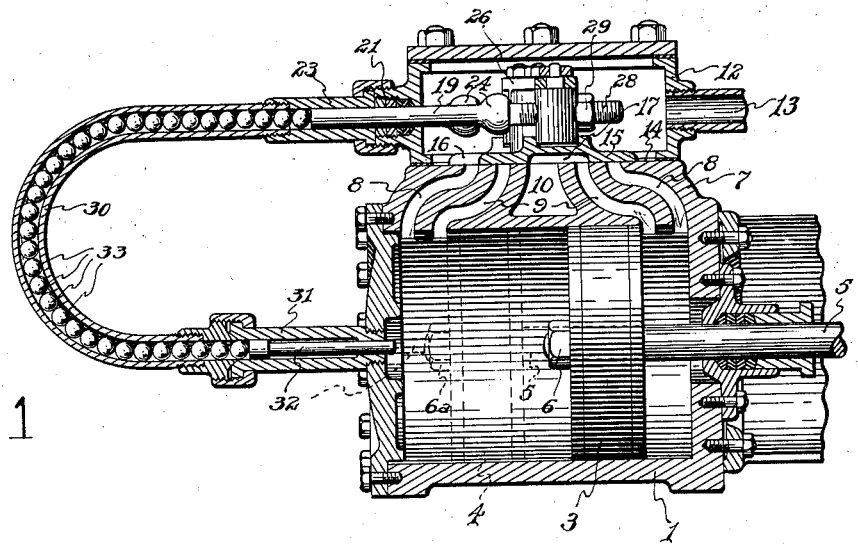
Figure 1 is a vertical longitudinal sectional view through one cylinder of a multiple cylinder engine, taken on line 1—1 of Figure 3, showing the steam chest plate removed and the valve control mechanism in the steam chest.

Referring to the drawings, the numerals 1 and 2 designate adjacent cylinders of conventional form, and which cylinders may be a part of any kind of engine or pump. The type shown is the type used in connection with heavy duty pumps. Slidably mounted within the cylinders 1 and 2 are pistons 3 and 4, having the usual piston rods 5, which are connected to the pistons by nuts 6 and 6a as clearly shown in Figure 1. The upper sides of the cylinders 1 and 2 are provided with a steam port portion 7 having intake ports 8 leading to the cylinders on opposite sides of the pistons 3 and 4 and with exhaust ports 9 and 10, through which the steam is exhausted at the ends of the strokes through an exhaust pipe 11. Mounted on the port portion 7 is a steam chest 12, into which steam is discharged from an intake pipe 13 connected thereto, all of which structure is of conventional form. The upper side of the port portion 7 is provided with a valve seat 14, and on which seat are slidably mounted slide valves 15 and 16 for controlling the intake and exhaust of steam to and from the respective cylinders 1 and 2 at the ends of the strokes of the pistons 3 and 4. The under sides of the slide valves 15 and 16 are provided with steam ports 17 for alternately placing the exhaust ports 9 and 10 in communication with the opposite ends of the cylinders at the exhaust ends of the piston strokes.

Figure 2:
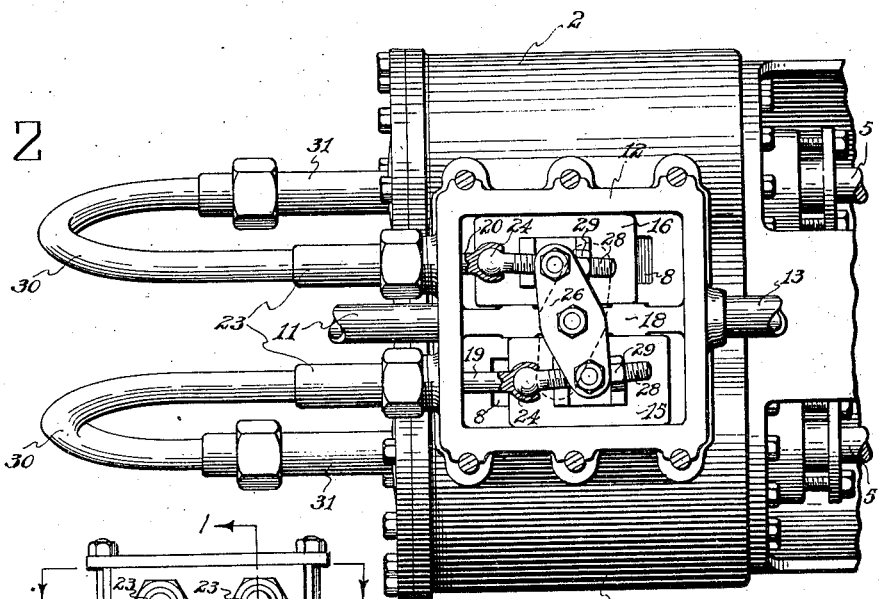
Figure 2 is a horizontal sectional view taken on line 2—2 of Figure 3, showing the valve control mechanism within the steam chest.
Figure 3:
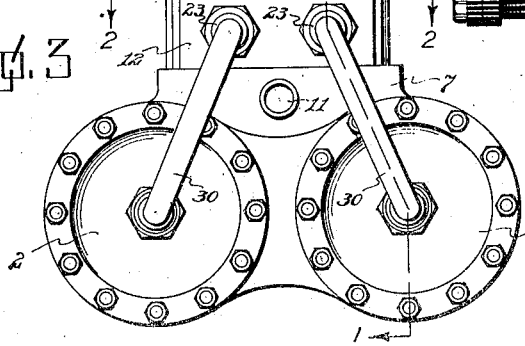
Figure 3 is an end view of the engine.

The slide valves 15 and 16 are guided in their reciprocation by a guide rib 18 carried by the steam chest 12 and preferably formed integral therewith, and by the opposite walls of the steam chest as clearly shown in Figure 2. With the slide valves 15 and 16 in the positions shown in Figures 1 and 2, the pistons 3 and 4 are alternately moved by the entrance of the steam through the intake ports 8 and exhaust of steam through the exhaust ports 9 and 10, all of which is controlled by the slide valves 15 and 16. In the conventional form of engine relatively heavy parts have been heretofore used for shifting the slide valve and this has put an additional burden on the engine requiring additional power, and to obviate this excessive weight and complicated mechanism a relatively light and positively operated valve shifting mechanism is provided. The valve shifting mechanism comprises push rods 19 and 20 slidably mounted in packing glands 21 carried by the steam chest 12, and in tubular extensions 23. The inner ends of the push rods 19 and 20 are provided with ball and socket connections 24 to the pivoted bosses 25, depending from the rock lever 26 above the slide valves 15 and 16 and pivoted between said slide valves on the spacing rib 18, as clearly shown in Figure 1. The lower end of the pivoted bosses 25 are transversely slidable in channels 27 in the upper sides of the slide valves 15 and 16, therefore it will be seen that they may move laterally in the channels 27 as the rock lever 26 is rocked. Threaded through the pivoted bosses 25 are adjustable shafts 28, which are held in adjustable positions by nuts 29 threaded thereon. The threaded shafts 28 are connected to the push rods 19 and 20 at the ball and socket joint 24. It will be seen that as the rock lever is rocked by the inward movement of one of the push rods 19 or 20 the slide valves 15 and 16 will be alternately shifted for allowing the intake or exhaust of steam to and from the cylinders 1 and 2. Connected to the tubular extensions 23 are curved tubular members 30, preferably formed from a rigid material and which tubular members 30, in turn, are connected to the tubular extensions 31 carried by the cylinder heads of the cylinders 1 and 2. Slidably mounted in the tubular extensions 31 are headed push rods 32, which extend axially into the cylinders 1 and 2 into the path of the ends of the piston rods 5 so that they will be alternately forced outwardly at the ends of the strokes of the pistons 3 and 4 for shifting the slide valves 15 and 16 for reversing the direction of movement of the pistons. Disposed within the tubular members 30 are closely engaged spherical members 33 and the end spherical members engage the push rods 19 and 20 and the headed push rods 32, therefore it will be seen that upon movement of one of the push rods 32, one of the push rods 19 or 20, according to which headed push rod is moved, will be moved for rocking the rock lever 26 and shifting or reversing the position of the slide valves 15 and 16. By providing the simple push rod ball and tubular member structures, a relatively light, positively operative mechanism is provided which is controlled by the pistons on the ends of the strokes thereof, hence it will be seen that bulky heavy structures are obviated. It will also be seen that by providing a lighter valve shifting structure less power will be needed to operate the engine.

Referring to Figure 6, in this form a single cylinder is used and a slide valve shifting operation takes place and is caused by the piston at the ends of its strokes. The piston 33a reciprocates in the usual manner within the cylinder 34 and pushes outwardly at the ends of its strokes the headed push rods 35 and 36. In Figure 6, the piston is approaching the end of its power stroke and when it engages the headed push rod 36, it will force the same outwardly, thereby forcing the spherical members 33 through the curved tubular member 37, and as said spherical members 33 fill the entire space within the tubular member 37, the push rod 38 which extends into the steam chest 39, and is connected to the single slide valve 40, said slide valve would be moved to the left, thereby allowing intake of steam through the port 41 and exhaust of steam through the ports 42. As the steam valve 40 moves to the left the push rod 43, connected to the slide valve 40, moves outwardly in the tubular extension 44 and the tubular member 45 being filled with spherical members 33, said spherical members will be moved outwardly, downwardly and inwardly and will force the headed member 35 inwardly where it will be engaged by the piston 33a when it reaches the dotted line position shown in Figure 6 for reversing the position of the slide valve 40 and positioning the headed push rod 36 where it will again be engaged by the piston 33a when it reaches the next end of its movement.

In Figures 1 to 4 inclusive the headed push rods 31 are alternately moved inwardly to piston engaging positions through the medium of the rock lever 26, however in a sinigle cylinder mechanism two headed push rods are used for accomplishing this result. The slide valve 40 is provided with spaced flanges 46 through which the adjacent inner threaded ends of the push rods 38 and 43 extend, however the inner ends of the push rods 38 and 43 are connected together by a turn buckle 47, which may be rotated for adjusting the push rods inwardly or outwardly.

From the above it will be seen that a valve actuating mechanism is provided for steam engines, which mechanism is simple in construction and positive in its operation. If desired jam nuts 48 may be provided on the push rods 38 and 43 for cooperating with the spaced flanges 36 and positively holding the push rods 38 and 43 in adjusted positions.

The invention having been set forth what is claimed as new and useful is:

1. The combination with a steam engine comprising adjacent cylinders, pistons slidably mounted in the cylinders and alternately moved in opposite directions, slide valves controlling the flow and exhaust of steam for alternately moving the pistons in opposite directions, a rock lever connection between the slide valves, push rods carried by the lever connection, push rods extending into the cylinders into the path of the pistons, a tubular member in which the push rods are slidably mounted, a plurality of engaged longitudinally movable members within the tubular members and forming means whereby when the rock lever carried push rods are alternately moved in one direction the push rods extending into the cylinders will be alternately moved inwardly into the cylinders into the path of the pistons.

2. The combination with a multiple cylinder steam engine having pistons slidably mounted therein, adjacent slide valves for controlling the flow of steam and exhaust of steam from opposite sides of the piston within the cylinder, a steam chest in which said slide valves are slidably mounted, a rock lever connection between the slide valves whereby upon movement of one in one direction the other will move in the opposite direction, tubular members connecting the steam chest and the cylinders, push rods within the steam chest and moved outwardly alternately upon alternate movement of the slide valves, said push rods being slidably mounted in the ends of the tubular members connected to the steam chest, push rods slidably mounted in the ends of the tubular members connected to the cylinders and extending into the cylinders into the path of the pistons, longitudinally movable flexible members within the tubular members and when moved longitudinally in either direction will move one or the other of the push rods, said slide valves being alternately shifted through the push rod and flexible connection by the pistons.

LAFAYETTE T. GOATES.